United States Patent [19]

Spigarelli et al.

[11] Patent Number: 4,697,730
[45] Date of Patent: Oct. 6, 1987

[54] CONTINUOUS SOLDER SYSTEM

[75] Inventors: Donald J. Spigarelli, Carlisle; Douglas J. Peck, North Andover; James L. Finney, Hudson, all of Mass.

[73] Assignee: The HTC Corporation, Concord, Mass.

[21] Appl. No.: 872,300

[22] Filed: Jun. 9, 1986

Related U.S. Application Data

[63] Continuation of Ser. No. 614,288, May 25, 1984, abandoned.

[51] Int. Cl.⁴ ............................ B23K 3/04; B23K 3/06
[52] U.S. Cl. ........................................... 228/37; 228/40
[58] Field of Search ................. 228/180.1, 180.2, 36, 228/37, 40, 42

[56] References Cited

U.S. PATENT DOCUMENTS

Re. 30,399  9/1980  Ammann et al. ............ 228/40
3,713,876   1/1973  Lavric .......................... 228/37
4,072,777   2/1978  Schoenthaler ................ 228/37
4,115,601   9/1978  Ammann et al. ........... 228/180.1
4,332,342   6/1982  van Der Put ............... 228/180.2
4,402,448   9/1983  O'Rourke .................... 228/37

FOREIGN PATENT DOCUMENTS 2036625  7/1980  United Kingdom ............ 228/42

Primary Examiner—Nicholas P. Godici
Assistant Examiner—Samuel M. Heinrich
Attorney, Agent, or Firm—Spencer T. Smith

[57] ABSTRACT

A system for the continuous production soldering of circuit boards and other products in which the product is heated by an independently controlled vapor phase system, and solder applied by a separately controlled application system operative to direct one or more controlled and defined streams of solder onto the product. A vessel is provided for containing a heated saturated inert vapor into which the product is introduced prior to solder application. One or more nozzles are disposed within the vessel for directing one or more streams of molten solder to the heated product. The heating and soldering operations are separately controllable and are each substantially independent of the control of the other.

4 Claims, 6 Drawing Figures

CONTINUOUS SOLDER SYSTEM

This is a continuation of co-pending application Ser. No. 614,288, filed on May 25, 1984, now abandoned.

FIELD OF THE INVENTION

This invention relates to soldering systems and methods and more particularly to a system and method for the vapor-phase heating of a product and separate application of solder to the heated product.

BACKGROUND OF THE INVENTION

Soldering is widely employed for the fabrication of many different products, especially products in the electronics field, notably printed circuit boards. For the production fabrication of printed circuit boards and similar products, wave solder systems have been widely employed. These systems include a reservoir of molten solder which is pumped in a wave, with the circuit board being transported in contact with the wave to cause wetting of the intended areas of the board. The solder wave serves as a source of heat for heating of the circuit board and also as the solder source for application of solder to the board. The wave solder apparatus is relatively complex and must be carefully designed and constructed to provide a solder wave of the appropriate dimensions and characteristics to provide the requisite heating and solder application to the particular product being processed. The length of the wave must be sufficient to provide sufficient time of contact to heat the surface to be soldered. The wave design is critical in relation to the product and speed of the product through the wave. There is a maximum speed beyond which a product cannot be conveyed through a particular solder wave and still achieve sufficient heating. For greater speeds, the wave would have to be reconfigured, which would necessitate a complete system redesign.

The height of the solder wave is also a critical factor and can be a limiting factor to the size of a product being processed. For example, in a printed circuit board in which leaded components are inserted, the lead lengths cannot be longer than the depth of the solder wave or else a board cannot be accommodated in the particular wave solder apparatus because of interference with the long component leads. Thus, care must be exercised in the assembly of components on a circuit board to assure that the lead lengths are less than the depth of the solder wave for the particular solder apparatus to be employed. Since the solder wave serves both as the source of solder and source of heating, the dynamics of the system become complex in designing a wave solder apparatus for particular purposes. Also, these dynamics make it difficult to alter the characteristics of the solder wave to accommodate different types of products.

Another type of production solder system is the drag solder system in which a reservoir of solder is provided into which a product is dipped and immersed either partially or completely to apply solder to the product. Here again the molten solder serves both as the source of heat for heating the product to a soldering temperature, and as the solder applicator.

The Ammann et al. U.S. Pat. No. Re. 30,399 shows a wave flow soldering apparatus in which the solder wave is provided at the bottom of a vessel containing a heated, saturated vapor. The product is conveyed through the vapor chamber and is heated by immersion in the vapor phase and soldered by passage through the solder wave. Solder is applied in an anaerobic atmosphere provided by the vapor phase but there is little improvement in the control or performance of the soldering operation by location of the solder wave apparatus in the chamber. The criticality and relative complexity of the solder wave remains the same as described above, and the presence of the solder wave within the heated vapor does not alter the critical design considerations of the wave apparatus.

An article entitled "A New Soldering Process", by W. R. George, *Brazing & Soldering*, No. 5, Autumn 1983, shows a drag soldering system in which the product is initially placed within a heated inert vapor phase prior to immersion into the molten solder bath.

The Sarnacki et al. U.S. Pat. No. 3,825,164 shows a soldering system having a tank containing a pool of molten solder at the bottom and covered by a liquid fluxing bath, with solder spray apparatus within the fluxing bath. A printed circuit card is inserted vertically into the fluxing bath for fluxing and preheating, and solder is sprayed onto one or both surfaces of the printed circuit card as the card is withdrawn from the tank.

SUMMARY OF THE INVENTION

The present invention provides a system for the soldering of circuit boards and other products in which the product is heated by an independently controlled vapor phase system, and solder applied by a separately controlled nozzle applicator system operative to direct controlled and defined streams of solder onto the product. A vessel is provided for containing a heated saturated inert vapor into which the product is introduced prior to solder application and by which the product is heated to soldering temperature. One or more nozzles are provided within the vessel for directing one or more streams of molten solder to the heated product, the impinging solder being retained by the areas of the product surfaces to which the solder will adhere. In the case of a circuit board, the solder is adherent to the conductive circuit paths, the plated-through holes which may be present in the circuit board, and to the leads or connection pads of components assembled on or inserted through the board.

Heating of the product is provided substantially by the heated vapor phase atmosphere within the vessel, and the establishment and control of this vapor atmosphere is separately provided by the vapor phase apparatus. Solder application is provided by the applicator nozzles which, with the associated solder pump and solder source, independently provide the intended solder streams for the particular product. Thus, the heating of the product and solder application to the product are separately controlled operations, and these operations are substantially independent of each other. The product can be introduced and removed from the processing vessel in any manner suitable for the particular application. Typically, for a continuous production process, the product is carried on a conveyor into the processing vessel for heating and solder application, and then carried by conveyor out of the vessel.

DESCRIPTION OF THE DRAWINGS

The invention will be more fully understood from the following detailed description taken in conjunction with the accompanying drawings, in which.

DETAILED DESCRIPTION OF THE PREFERRED EMBODIMENTS

Figure 1:
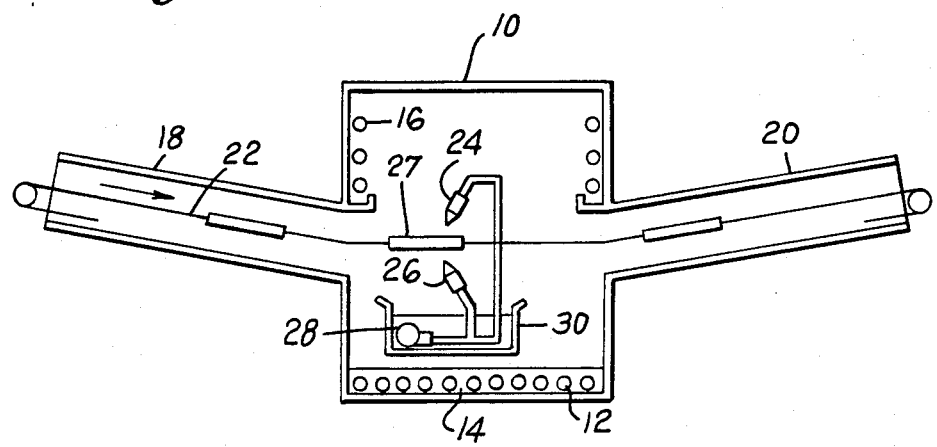
FIG. 1 is a diagrammatic elevation view of a soldering system in accordance with the present invention.

A soldering system in accordance with the invention is shown in a preferred embodiment in FIG. 1, this embodiment being especially suited to the soldering of electronic circuit boards. A closed vessel 10 defines an interior chamber in which an inert saturated vapor is provided at a predetermined elevated temperature for heating of a product to be soldered. Heaters 12 are disposed at the bottom of vessel 10 and are operative to heat a vapor phase or electronic liquid 14, typically Fluorinert FC-70, to a temperature sufficient to provide a heated saturated vapor of that liquid within the chamber. Cooling coils 16 can be disposed around the vessel walls at a position to define the upper extent of the vapor zone within the chamber. Circuit boards 27 are conveyed into the chamber by means of an entrance throat 18, and out of the chamber by means of an exit throat 20, each throat outwardly extending from opposite side walls of the vessel 10. A conveyor 22 extends through the entrance throat 18, interior chamber of vessel 10 and exit throat 20, and is operative to convey the circuit boards into and out of the chamber. The conveyor can be of any suitable form to accommodate the particular product being processed. For circuit boards, the conveyor can include frames for holding the board edges, leaving the board surfaces exposed for soldering. A pair of nozzles 24 and 26 is disposed in the chamber, each in a position to apply a stream of solder onto respective opposite surfaces of the circuit boards which are conveyed past the nozzles along the product travel path within the chamber.

A solder pump 28 is disposed within the vessel 10 in a sump 30 containing molten solder to provide solder to nozzles 24 and 26. The sump 30 collects excess solder which falls or drains from the boards after solder application by the nozzles. The sump also serves as a solder supply for the pump 28. A separate solder supply may alternatively be provided. The solder pump can alternatively be disposed external to the vessel.

The entrance and exit throats are preferably configured in conjunction with the vessel to minimize the outward flow of vapor from the vessel to the atmosphere. Such configuration can be as shown in U.S. Pat. No. 4,389,797 of the same assignee as this invention. The present invention is not limited to use with such entrance and exit throats, as many different forms of product ingress and egress to and from the vessel can be provided to suit particular product configurations and specific operational requirements. It is preferable for continuous processing to provide a straight-through or substantially straight-through system in which the product can be conveyed continuously through the system for soldering operations. The entrance and exit throats 18 and 20 can be disposed in a substantially horizontal position or can be inclined upward or downward to provide an intended conveyance path and the requisite minimization of vapor loss from the throats to the atmosphere.

The heating of a product entering the vessel chamber, and the application of solder to the heated product, are separately controllable and are each substantially independent of the control of the other. The product entering the chamber is heated by the vapor phase atmosphere within the chamber. The establishment and control of the heated vapor atmosphere is provided by the vapor phase apparatus which includes the heaters 12 and vapor phase liquid and the associated heater control. The solder application is provided by the applicator nozzles 24 and 26, and associated source 30 and pump 28, which are constructed and adjusted to provide the intended solder streams for the product which has prior to solder application been heated to an intended temperature by the vapor phase apparatus of the system.

Figure 2:
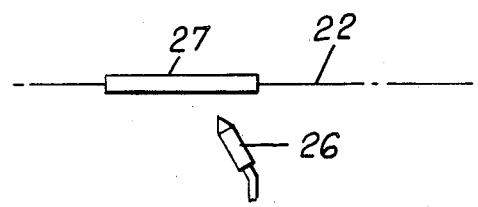
FIG. 2 is a diagrammatic elevation view of an alternative embodiment of the system of FIG. 1 having a single nozzle disposed below the product.
Figure 3:
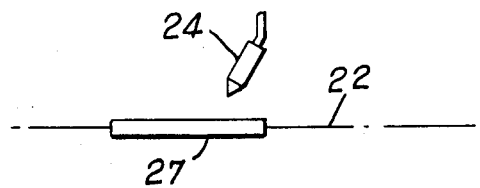
FIG. 3 is a diagrammatic elevation view of a further alternative embodiment of the system of FIG. 1 having a single nozzle disposed above the product.

If only one side of the circuit boards 27 is to be processed, the system can be implemented with only bottom nozzle 26, as shown in FIG. 2, or with top nozzle 24, as shown in FIG. 3.

Figure 4:
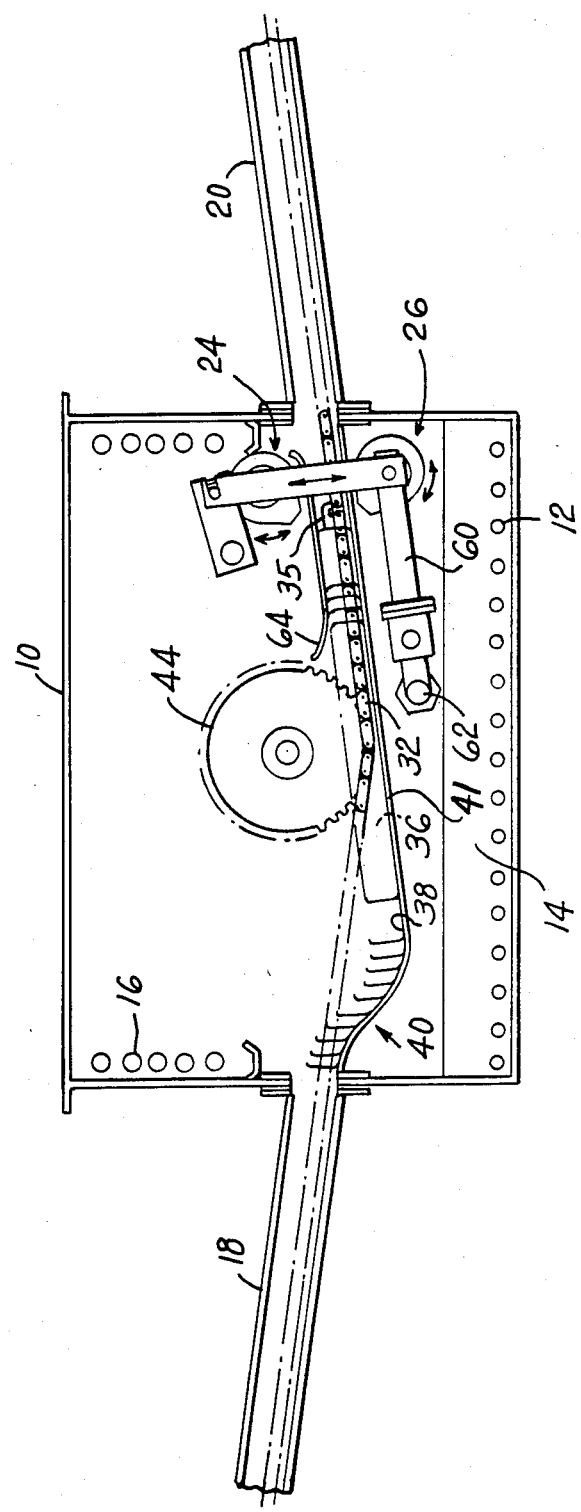
FIG. 4 is a diagrammatic elevation view of the system in a preferred implementation.
Figure 5:
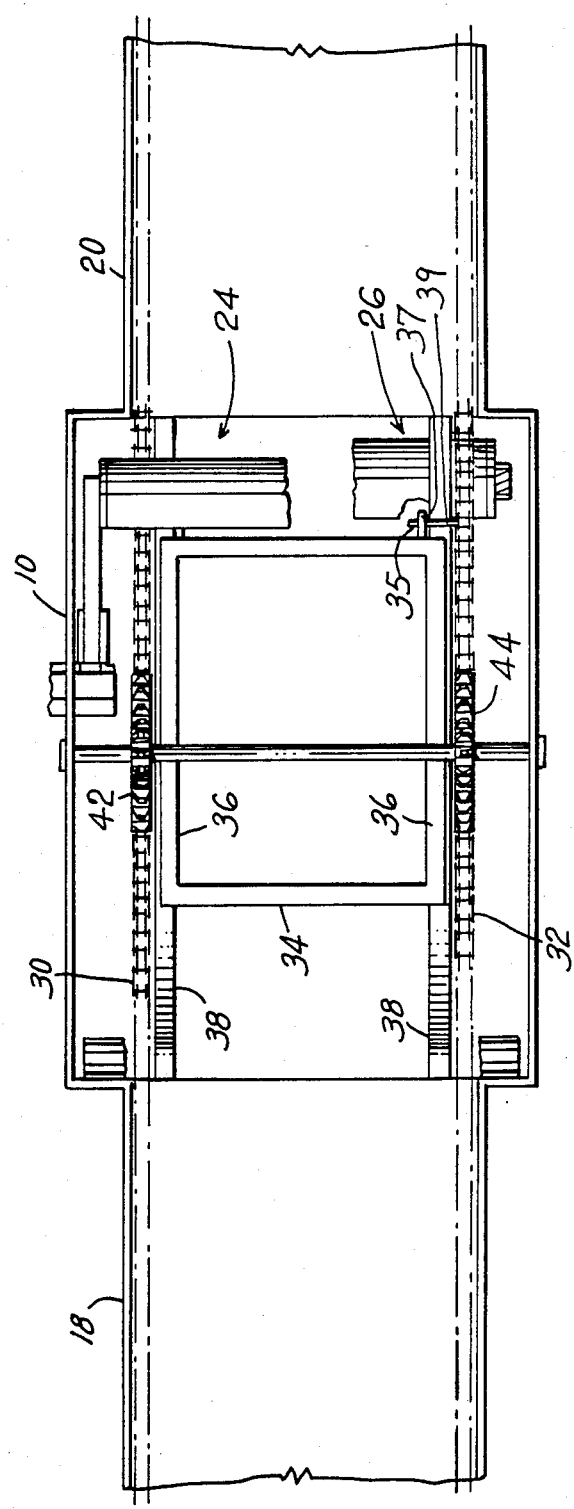
FIG. 5 is a partially cutaway top view of the system of FIG. 4.

The system of FIG. 1 is shown in typical implementation in FIGS. 4 and 5. A pair of conveyor chains 30 and 32 are coupled to frames 34 spaced along the chains and which are operative to retain printed circuit boards for transport through vessel 10. The frames 34 are each coupled at their forward end to the driving chains 30 and 32 by a coupling 35 in the form of a catch 37 secured to the frame 34 which engages a pin 39 secured to the chain 32 and include side members or skids 36 which slide along guide surfaces 38 within the vessel 10. The guide surfaces within the vessel includes a downward arcuate portion, illustrated by reference 40, at the entrance portion of the vessel and then follow a uniform upwardly path through the vessel which is substantially colinear with the exit throat 20 and which is much longer in length than the length of the arcuate portion. A pair of idler wheels 42 and 44 is provided within the vessel for the respective chains 30 and 32 to change the direction of chain motion, as illustrated. The frame 34 remains parallel to the inlet throat until the forward end of the frame engages the upwardly inclined portion 41 of the guide surfaces. The forward end then follows this inclined portion 41 and the opposed rearward corners of the frame 34 follow the downwardly inclined throat and then the arcuate guide portion 40 until the frame 34 becomes parallel to the upwardly inclined portion 41. After entrance of a frame and the circuit board carried thereby into the vessel, the frame and circuit board follow the path of the guide surfaces 38 and assume an upwardly inclined orientation as shown in FIG. 4 for linear upward travel through the processing chamber. The circuit board, by this means, is conveyed in an intended orientation for uniform travel past the solder nozzles so that an intended relative position between the board surfaces and the confronting nozzles can be maintained within the shortest convenient vessel length in order to minimize the length of time that the circuit board is subject to the high temperatures of the processing zone within the vessel.

A pair of hold-down plates 64 is disposed above the conveyor to resiliently engage the side skids 36 of the conveyor frame and hold the frame and circuit board contained by the frame down against the guide surfaces 38. The circuit board is thus maintained in an accurate guided position along its path past the solder nozzles.

Figure 6:
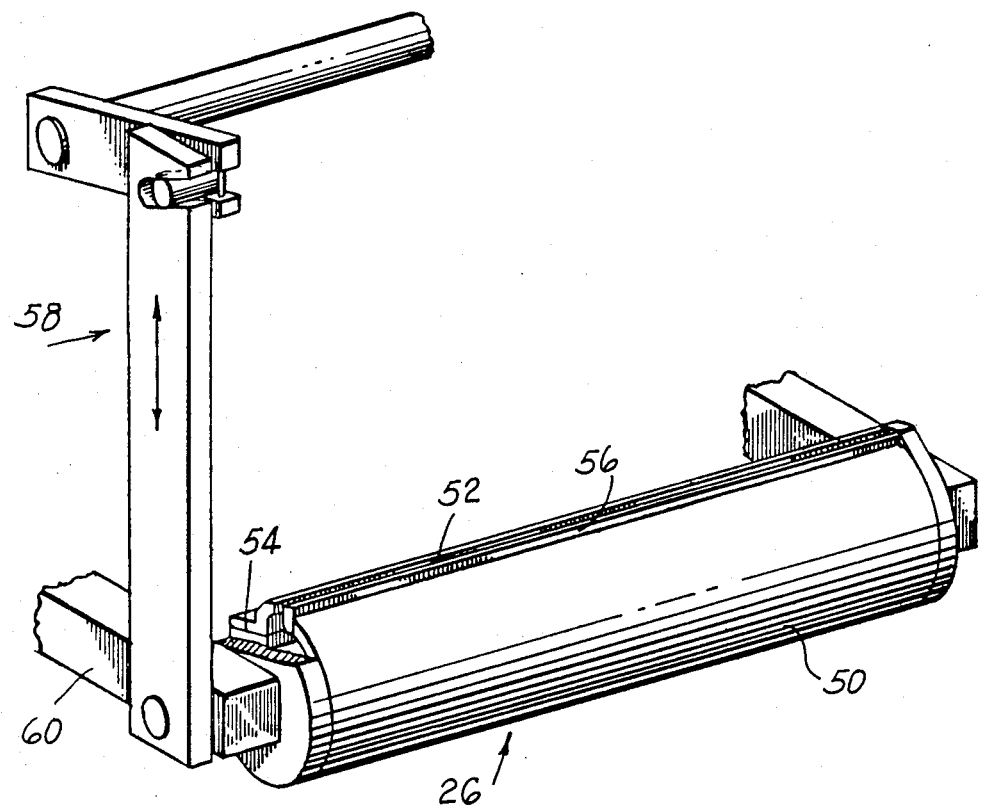
FIG. 6 is a partially cutaway pictorial view of a solder nozzle assembly.

The solder nozzles 24 and 26 are provided on respective sides of the board transported therebetween, and each nozzle is adjustable in the angular orientation of the nozzle orifice with respect to the circuit board, and in the offset or spacing of the nozzle from the confronting board surfaces. Typically, the nozzles are angularly adjustable over a range of 45 degrees to either side of an axis normal to the board surface, and are adjustable in offset from the board surfaces in the range of ¼-1 inch. The lower nozzle 26 is further illustrated in FIG. 6 and comprises an elongated generally cylindrical tubular member 50 having an elongated linear orifice 52 along the length thereof and of length sufficient to provide a solder stream across the entire circuit board width. The member 50 has a lip 54 adjustable with respect to a lip 56 to provide an adjustable orifice. Typically, the orifice has a gap in the range of 10-30 mils. The cylindrical member 50 is rotatable about its axis to provide for angular adjustment of the orifice 52 to the intended angle of incidence of the solder stream applied to the confronting board surface. A linkage 58 is coupled to the member 50 for upward and downward adjustment of member 50 to select the spacing between the nozzle and the confronting board surface. The upper nozzle 24 is similarly adjustable in offset from the confronting board surface and angular orientation. Molten solder is pumped to the nozzles via piping 60 which is coupled to a supply manifold 62 which in turn is coupled to the molten solder source or sump.

Each of the nozzles is adjustable to provide a selectable angular orientation of the nozzle with respect to the confronting board surface, and to select the gap or distance between the nozzle and the confronting board surface. The angular adjustability of each nozzle provides an angle of incidence for the impinging solder stream which can be normal to the board surface or at an angle with or against the travel direction of the board. The angular orientation of each nozzle and the distance between the nozzle and board surface is determined to provide the intended quantity of solder and definition of the solder stream for the particular product being processed. The solder streams are separately controlled to provide the intended application of solder. Since the product prior to solder application has been heated by the vapor phase within the vessel to soldering temperature, the solder application nozzles need be controlled only to provide the desired solder application, and not to heat the product.

The system is useful in soldering a variety of circuit board types. The system can be employed for so-called bare boards which are printed circuit boards having circuit patterns on one or both board surfaces without any components thereon, and which can include through-holes interconnecting the circuit patterns. The system can also be employed for circuit boards containing surface mounted components on one or both surfaces thereof, leaded components having leads which extend through the board, or a mixture of leaded and surface mounted components. The apparatus of the illustrated embodiment can be employed with either or both solder nozzles operative for a particular processing run. In some cases, solder need only be applied to one board surface, in which case the other solder nozzle can be deactivated by appropriate valving of the solder supply to that nozzle.

The system can also be employed for solder stream application by a nozzle to one board surface, with reflow soldering provided on the opposite board surface. In some types of circuit boards, it is preferable to attach components on a board surface by reflow solder techniques in which a solder paste is applied to the board, and the board thereafter is heated to cause the solder paste to reflow and form a bond between the associated component and conductive areas of the board surface. Reflow soldering can be accomplished in known manner by the present system by introduction of the circuit board into the heated saturated vapor within the vessel. The opposite board surface can be soldered by the solder stream from the associated nozzle. The present system is therefore versatile in providing both solder stream and reflow solder capability within a single apparatus, all within the environment of the heated vapor phase.

The vapor phase atmosphere within vessel 10 is heated to a temperature typically in the range of 415°-450° F. The solder source is maintained typically in the same range. The solder within sump 30 is maintained in molten state by the heated environment within the vessel. Alternatively, separate heaters can be provided in or around the sump to maintain the solder at intended temperature. The vapor phase atmosphere is therefore at a temperature sufficient for heating the circuit boards to soldering temperature so that, prior to solder stream application by the solder nozzles, the product is already at the soldering temperature. The solder stream of each nozzle is determined in relation to the viscosity of the molten solder, the pressure provided by the pump 28 and the orifice dimensions of the nozzle to produce the intended stream configuration for proper impingement of solder upon the board. The product is conveyed through the system at a speed sufficient to provide heating of the board by the vapor phase atmosphere within vessel 10 and proper application of solder to the heated product. In typical implementation, the circuit boards are conveyed through the vessel at a speed of 4-10 feet per minute.

The invention is not to be limited by what has been particularly shown and described except as indicated in the appended claims.

What is claimed is:

1. A vapor processing system comprising a vessel for containing a processing vapor,
   means for heating an electronic liquid contained within said vessel to establish a saturated vapor zone,
   an inlet throat communicating with and sloped downwardly towards said vessel,
   an opposing exit throat communicating with and sloped downwardly towards said vessel,
   a pair of conveying chains extending through said inlet throat, vessel and exit throat,
   frame means for retaining printed circuit boards for transport through the system,
   means for coupling the forward end of said frame means to said conveying chains,
   spaced, parallel guide means extending across said vessel from the inlet to the exit throat for supporting the opposed rearward corners of said frame means,
   said guide means each including a first linear portion substantially colinear with the bottom surface of said exit throat and a second arcuate portion for merging the bottom surface of said inlet throat with said first linear portion, said first linear portion comprising means for engaging the forward end of said frame means when said frame is parallel to said inlet throat, whereby following such engagement said forward end will be displaced upwardly and said rearward end will follow said second arcuate portion until said frame means becomes parallel to said first linear portion.

2. A vapor processing system according to claim 1, wherein said coupling means includes pin means secured to said conveying chains.

3. A vapor processing system according to claim 1, wherein said second arcuate guide means portion is short in length when compared to the length of said first linear portion.

4. A vapor processing system according to claim 1, wherein said frame means includes side skid members and further comprising a pair of hold down plates disposed above said conveying chains for resiliently engaging said frame means to hold said side skid means against said linear portion of said guide means.

* * * * *